United States Patent
Varghese et al.

(10) Patent No.: US 10,087,688 B2
(45) Date of Patent: Oct. 2, 2018

(54) ENERGY ABSORPTION SYSTEM FOR SUBTERRANEAN TOOL HIGH IMPACT LOADS

(71) Applicant: BAKER HUGHES INCORPORATED, Houston, TX (US)

(72) Inventors: Sibu Varghese, Houston, TX (US); Ganesh K. Nanaware, Katy, TX (US); Andy Tom, Houston, TX (US)

(73) Assignee: Baker Hughes, a GE company, LLC, Houston, TX (US)

(*) Notice: Subject to any disclaimer, the term of this patent is extended or adjusted under 35 U.S.C. 154(b) by 651 days.

(21) Appl. No.: 14/620,783

(22) Filed: Feb. 12, 2015

(65) Prior Publication Data

US 2016/0237761 A1 Aug. 18, 2016

(51) Int. Cl.
*E21B 17/07* (2006.01)
*F16F 7/12* (2006.01)
*F16F 9/58* (2006.01)

(52) U.S. Cl.
CPC .............. *E21B 17/07* (2013.01); *F16F 7/126* (2013.01); *F16F 9/58* (2013.01)

(58) Field of Classification Search
CPC ... E21B 17/07; F16F 7/126; F16F 9/58; F16F 9/585
See application file for complete search history.

(56) References Cited

U.S. PATENT DOCUMENTS

| | | | |
|---|---|---|---|
| 3,767,142 A | 10/1973 | Grosgebauer | |
| 3,913,963 A | 10/1975 | Persicke | |
| 4,074,762 A | 2/1978 | Parker et al. | |
| 4,232,751 A | 11/1980 | Trzeciak | |
| 4,300,364 A | 11/1981 | Van Der Lely et al. | |
| 4,317,485 A | 3/1982 | Ross | |
| 4,997,037 A * | 3/1991 | Coston | E21B 17/07 166/105 |
| 5,090,755 A * | 2/1992 | Garnweidner | F16F 7/127 188/375 |
| 5,645,208 A | 7/1997 | Haytayan | |
| 6,109,355 A | 8/2000 | Reid | |
| 7,484,905 B2 | 2/2009 | Gelfand et al. | |
| 7,530,759 B2 | 5/2009 | Gelfand et al. | |
| 2003/0089497 A1* | 5/2003 | George | E21B 17/07 166/297 |
| 2005/0016805 A1* | 1/2005 | Brehm | F16F 9/585 188/315 |

(Continued)

*Primary Examiner* — Blake E Michener
(74) *Attorney, Agent, or Firm* — Steve Rosenblatt (57) ABSTRACT

A shock absorbing device for a subterranean tool features a plurality of sequentially shearing shear pins that shear after incremental relative motion of the affected components. The travel stop is located internally to a series of spaced collets supported off a ring. Impact of an impact ring segments on the travel stop segments located internally to each collet provides a shock absorbing capability as the collets are placed in tension and deflect by radial flexing in opposed directions. The relatively moving parts are rotationally locked with the last of the shear pins to shear. A backup pair of contacting shoulders are provided if the primary engaging shoulders fail to support the lower end of the tool after impact. A snap ring maintains the parts in the shifted position after impact.

23 Claims, 7 Drawing Sheets

(56) References Cited

U.S. PATENT DOCUMENTS

| | | | |
|---|---|---|---|
| 2005/0189187 A1* | 9/2005 | Leung | B60R 19/26 |
| | | | 188/371 |
| 2007/0205066 A1* | 9/2007 | Vinayagamurthy | B60R 19/34 |
| | | | 188/376 |
| 2014/0190703 A1* | 7/2014 | Tennant | E21B 17/04 |
| | | | 166/365 |
| 2014/0196890 A1 | 7/2014 | Tom | |
| 2016/0160576 A1* | 6/2016 | Obrejanu | E21B 17/05 |
| | | | 166/380 |

\* cited by examiner

ENERGY ABSORPTION SYSTEM FOR SUBTERRANEAN TOOL HIGH IMPACT LOADS

FIELD OF THE INVENTION

The field of the invention is shock absorption in subterranean tools and more specifically devices that slow the acceleration of parts toward each other with shear devices and further absorb energy with flexibly mounted impact surfaces.

BACKGROUND OF THE INVENTION

In normal operation of subterranean tools shifting of components to reconfigure a tool for removal or for other tasks has the result of initiating substantial acceleration of one part with respect to an adjacent part until a supported travel stop is encountered which produces high impact shock loading as the acceleration and velocity comes to a stop. In some applications the relatively moving components are not sufficiently centralized and this lack of centralization can create angular misalignment at the impact location. The result of such offset impacts is difficulty in redressing the tool for subsequent use and, in extreme cases component damage to threads or adjacent structures.

Shock absorbers are used in a variety of applications. One unique issue in subterranean tool applications is the extremely confined environments in which components have to be mounted and supported. Typically shock absorbers where space is not an issue are telescoping structures where fluid is displaced through an orifice at a predetermined rate to reduce velocities before impact. Some of these designs incorporate shear pins that break to allow the shock absorber to do its job. Some example of various applications for shock absorbing systems are U.S. Pat. No. 3,913,963 (motor vehicle); U.S. Pat. No. 3,767,142 (flare parachute); U.S. Pat. No. 7,484,905 (traffic control bollard); U.S. Pat. No. 7,530,759 (traffic barrier) and U.S. Pat. No. 4,300,364 (overload coupling). In some designs the spring provides a lost motion feature that protects a pivot pin such as U.S. Pat. No. 5,645,208 (spring 119 and pin 128). Other designs in subterranean applications involve plastic deformation by a wedge as a shock absorbing mechanism as illustrated in U.S. Pat. No. 6,109,355. Some downhole shock absorbing devices are illustrated in U.S. Pat. No. 4,232,751 (FIG. 2b items 57 and 55); U.S. Pat. No. 4,074,762 (FIG. 5) and U.S. Pat. No. 4,317,485 (items 54 and 60).

FIGS. 6c and 7c of US 2014/0196890 represent a known tool for setting a liner hanger using a movable sleeve that allows the closing of a flapper that has a rupture disc in the flapper. After the slips are set and the flapper sleeve is shifted to allow pressure buildup to set the liner hanger seal after the liner hanger slips are earlier set for support. At a predetermined pressure the rupture disc is failed and the running tool is removed. This tool addressed an issue of developed backpressure in the running tool due to rapid removal causing backpressure at the ruptured disc and thus unintentionally pushing out the running tool slips for another bite which would impede removal of the running tool. Other than simply slowing down the tool speed during removal, this design opened a port when the flapper sleeve shifted to put the running tool slips in pressure balance so that the developed backpressure during tool removal did not create an unbalanced force on the running tool slips to allow rapid removal of the running tool. The problem with this tool is that in response to pressure application to set the liner hanger seal and release the running tool there was a severe impact between radial surfaces 108 and 114 that was not always a concentric impact which, as described above, created issues of redressing the tool for another use and could even cause component damage requiring part replacement. Thus the present invention was inspired by the need reduce such impact loading that could often be at an angular impact due to component misalignment during relative movement.

One objective of the present invention is to absorb high kinetic energy within a tool by using a collet style load ring that behaves like a spring and introducing shear screws by strategically placing them to reduce the high impact velocity, which ultimately reduces the kinetic energy and the impact load on the tool. In one use, the invention pressure balances the anchor of the TORXS® running tool offered by Baker Hughes Incorporated, as shown in US 2014/0196890 but further absorbs high impact loads without transmitting them through the tool's threaded connections and thin cross-sectional areas. High impact load can damage threaded connections by stripping or jumping the start of the threads which makes it difficult to disassemble the tool.

During a recent laboratory test conducted on a 7" TORXS balanced anchor design as shown in US 2014/0196890, when pressure was applied to shear the screws and move the sleeve axially to open cylinders and balance the anchor, high impact load caused damage to the threaded connection due to axis misalignment and high kinetic energy. A torque machine was used to break the connections where torque value observed was as high as 3000 ft-lb. The threads were damaged which prevented reuse of the parts. The high impact load was generated due to motion of tool components with high kinetic energy after shearing of a primary shear screw at design pressure. This high kinetic energy, if not absorbed, can cause failure of the tool due to high impact loading through the tool joint and thin cross-sectional areas thus causing bearing failures and tool joint damage due to stripping of threads or jumping of start of threads.

The preferred embodiment of the present invention encompasses a collet style load ring which behaves like a spring when engaged. It absorbs high impact energy by transmitting the load in tension through the collet and dissipates part of the load when the collet collapses thus being a load absorber for this application. The design centralizes the tool before and after impact because of a proper supporting scheme. In addition to primary shear screws, there are secondary shear screws that are strategically placed in multiple rows such that when the tool starts moving with high kinetic energy, the second row of shear screws shears and minimizes the velocity of the tool in motion. The third row of shear screws helps to align the collet with the locating shoulder on the lower connector where the collet engages. Third row shear screws also keeps the two parts axially locked to each other with the help of the balancing sleeve above it. The last shear sequence, i.e. third row of shear screw, shear just before the collet engages the lower connector shoulder thus dampening the impact load further. Another advantage is that if the collet style design ever failed then there is a secondary containment mechanism to take the impact load and hold the tool in place without losing it down hole. This is done with the help of the balancing sleeve that is on the outside of the collet mechanism. Other shock absorbing applications in subterranean tools are contemplated. Those skilled in the art will appreciate these and other aspects of the present invention from a review of the preferred embodiment of the invention and the associated drawings while recognizing that the full scope of the invention is to be found in the appended claims.

SUMMARY OF THE INVENTION

A shock absorbing device for a subterranean tool features a plurality of sequentially shearing shear pins that shear after incremental relative motion of the affected components. The travel stop is located internally to a series of spaced collets supported off a ring. Impact of an impact ring segments on the travel stop segment located internally to each collet provides a shock absorbing capability as the collets are placed in tension and deflect by radial flexing in opposed directions. The relatively moving parts are rotationally locked with the last of the shear pins to shear. A backup pair of contacting shoulders are provided if the primary engaging shoulders fail to support the lower end of the tool after impact. A snap ring maintains the parts in the shifted position after impact.

DETAILED DESCRIPTION OF THE PREFERRED EMBODIMENT

Figure 1:
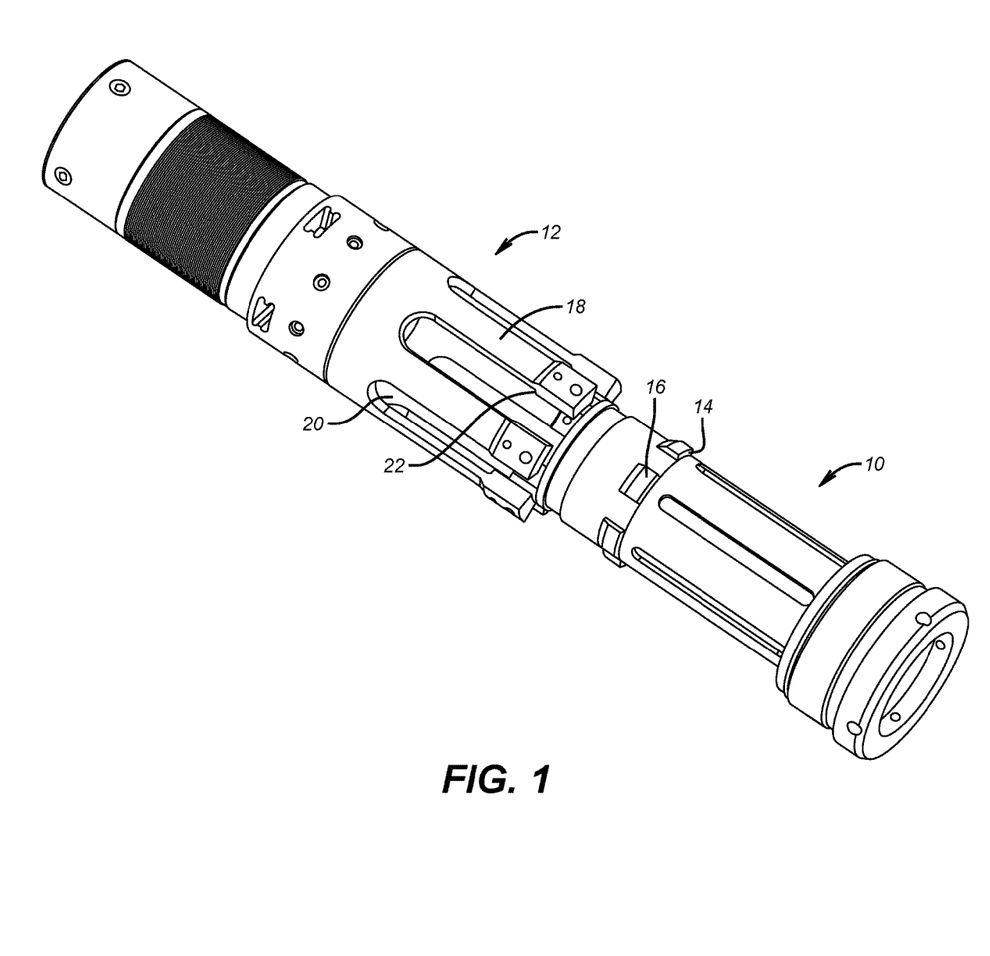
FIG. 1 is an exploded perspective view of the relatively moving components before assembly.
Figure 2:
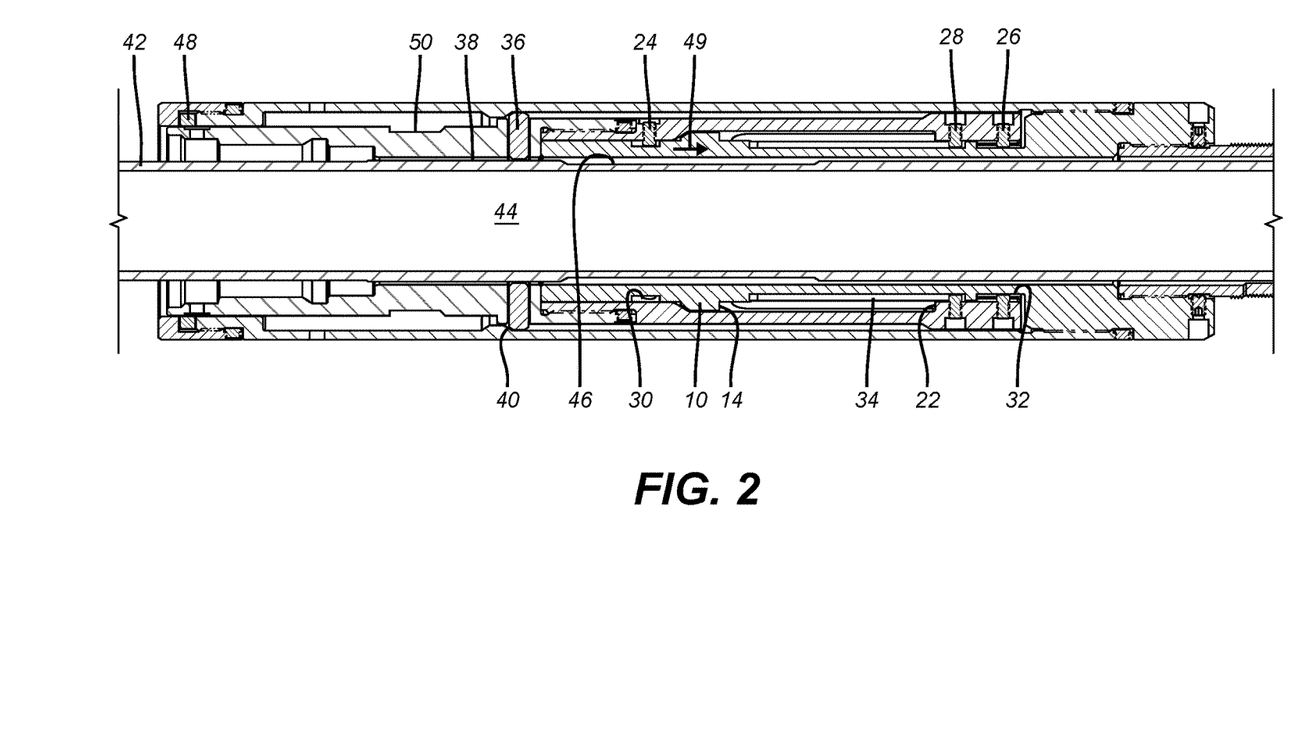
FIG. 2 is a section view of the assembled components in the run in position locked against relative movement.

Referring to FIG. 1 the fixed component 12 and the movable component 10 are aligned for assembly. Impact surfaces 14 are positioned on the lower end of projections 16 of the fixed component 12. Movable component 10 has an array of spaced collet fingers 18 defining axial gaps 20 in between. For assembly, the projections 16 are aligned with gaps 20 until the travel stops 22 pass the impact surfaces 14 and relative rotation then brings impact surfaces 14 into alignment with impact travel stops 22. At this point first shear pin 24, second shear pin 26 and the third shear pin 28 can all be installed as shown in FIG. 2. Pin 24 is in a short axial slot or radial groove 30. Pin 26 is in another short axial slot or radial groove 32 while pin 28 is in a long axial slot 34. While pins 24, 26 and 28 are recited in the singular multiples of each of them are contemplated. Locking dog 36 is initially supported on surface 38 against a stop 40. In the preferred embodiment sleeve 42 is used to release the flapper and equalize running tool slips to prevent them from extending as the rupture disc in the flapper is broken and the running tool is removed with flow moving through the broken rupture disc as described in detail in US 2014/0196890. However, the present invention is applicable in a variety of instances independent of such an application where relative movement exists that ends in impact in situations with high acceleration rates that result in a potentially high net impact force.

In FIG. 2 pressure in passage 44 will raise sleeve 42 to position recess 46 opposing dogs 36 so that the applied pressure will apply a downward force in the direction of arrow 49 to start the movable component 10 and its impact surfaces 14 toward stops 22. As this happens the pin or pins 24 get impacted by an end of their respective slot 30 to reduce acceleration and relative velocity of the components 10 and 12. Because slot 32 is longer than slot 30 the second shear pin 26 breaks at a later time as more relative axial movement between components 10 and 12 occurs. However, because slot 34 is even longer than slot 32 the shear pins 28 remain intact as impact surfaces 14 approach travel stops 22. During the entire relative movement described thus far the pin 28 acts as lock against relative rotation of components 10 and 12 so as to keep impact surfaces 14 aligned with travel stops 22. In a brief instant before impact surfaces 14 impact stops 22 the pin 28 shears. After such impact the snap ring 48 engages groove 50 to keep the movable component 10 from moving in a direction in reverse of arrow 49.

Figure 3:
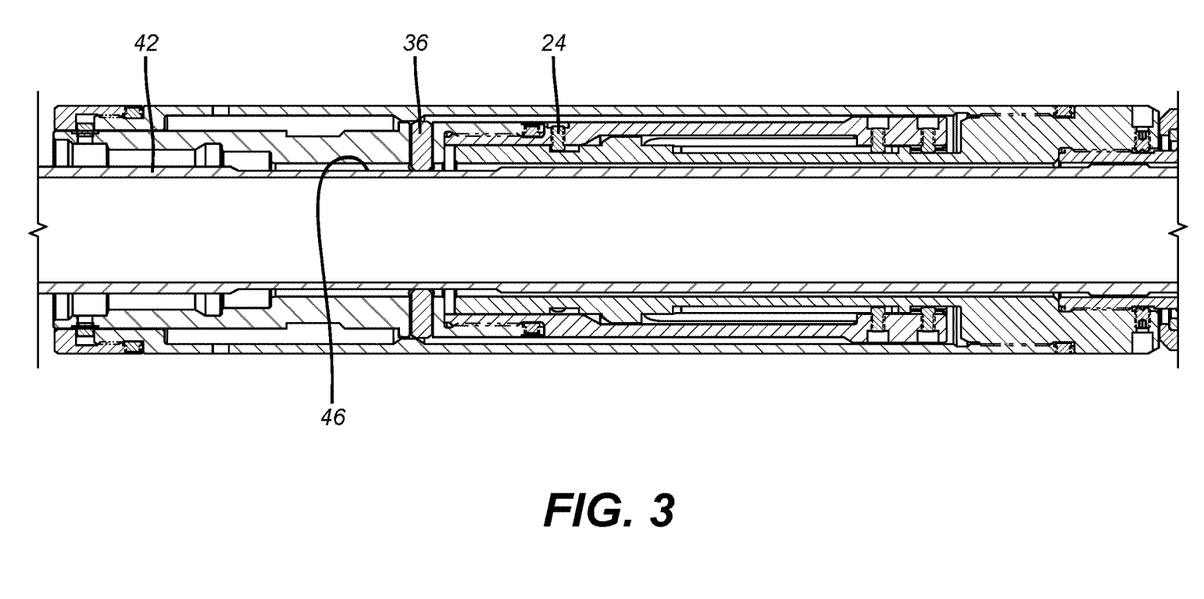
FIG. 3 is the view of FIG. 2 with the lock removed and the primary shear screw ready to be sheared.
Figure 4:
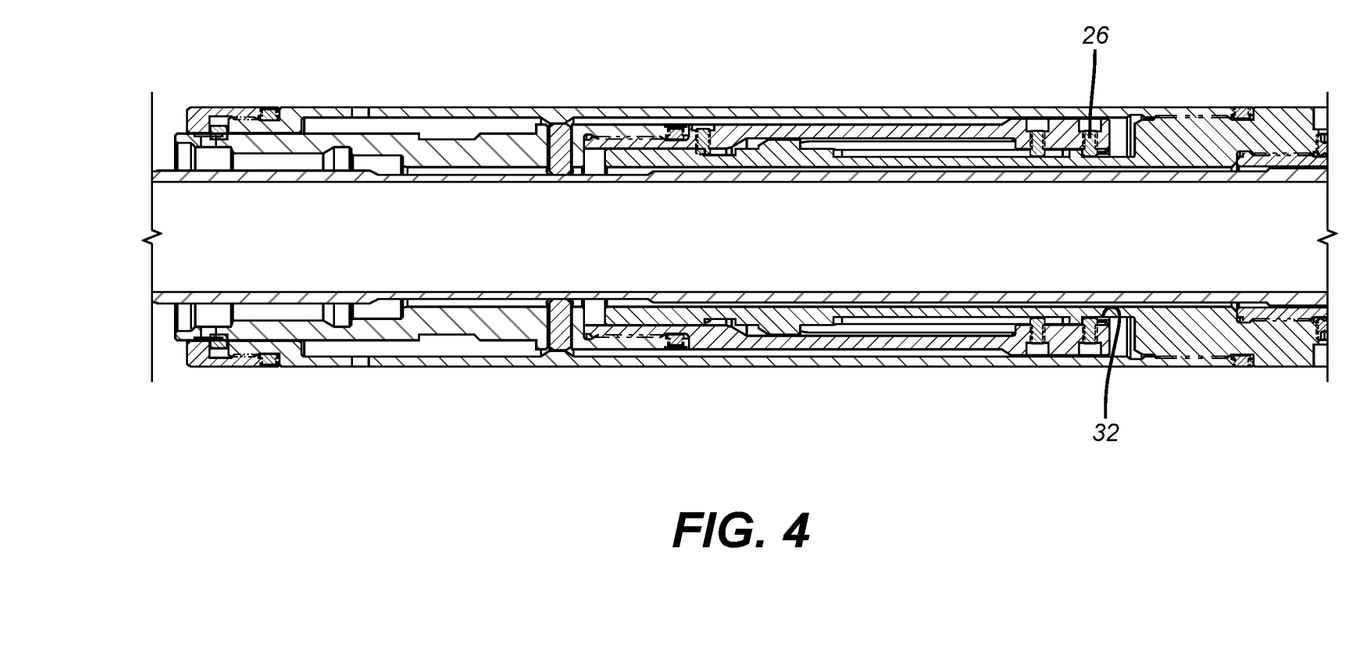
FIG. 4 is the view of FIG. 3 with the primary shear screw sheared and the second shear screw ready to be sheared.
Figure 5:
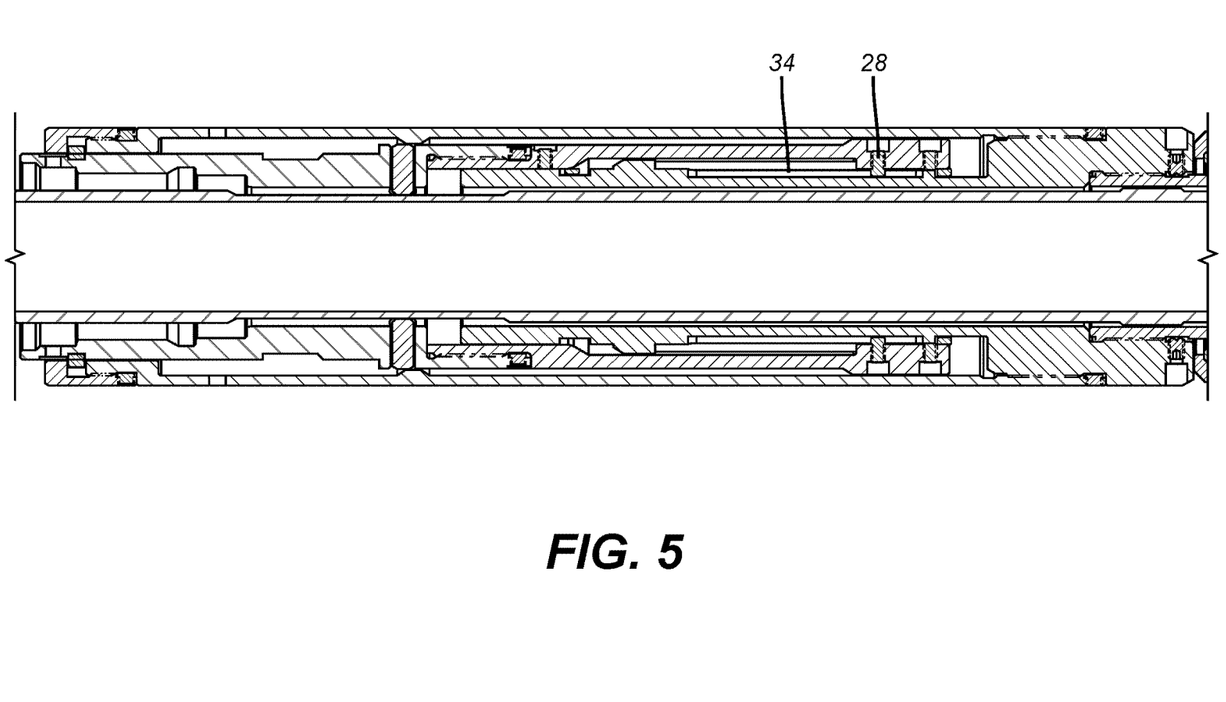
FIG. 5 is the view of FIG. 4 with the second shear screw sheared with the third shear screw functional and moving in a guide slot to maintain the components in rotational alignment.
Figure 6:
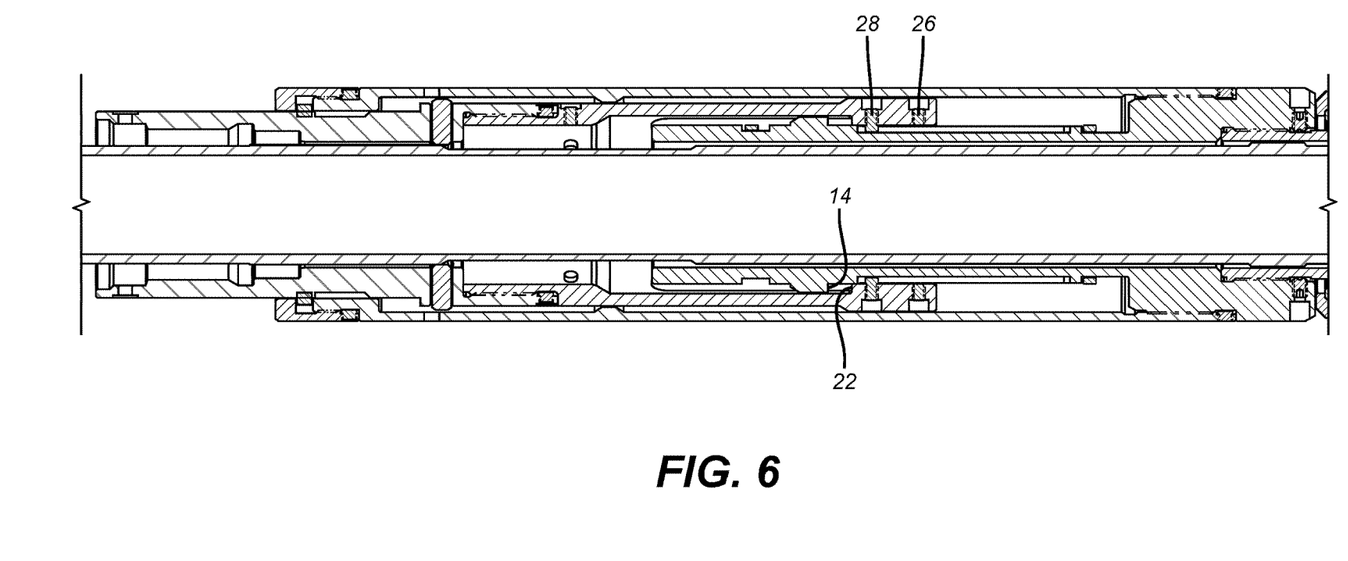
FIG. 6 is the view of FIG. 5 with the third shear screw about to shear and the impact surface near the travel stop.
Figure 7:
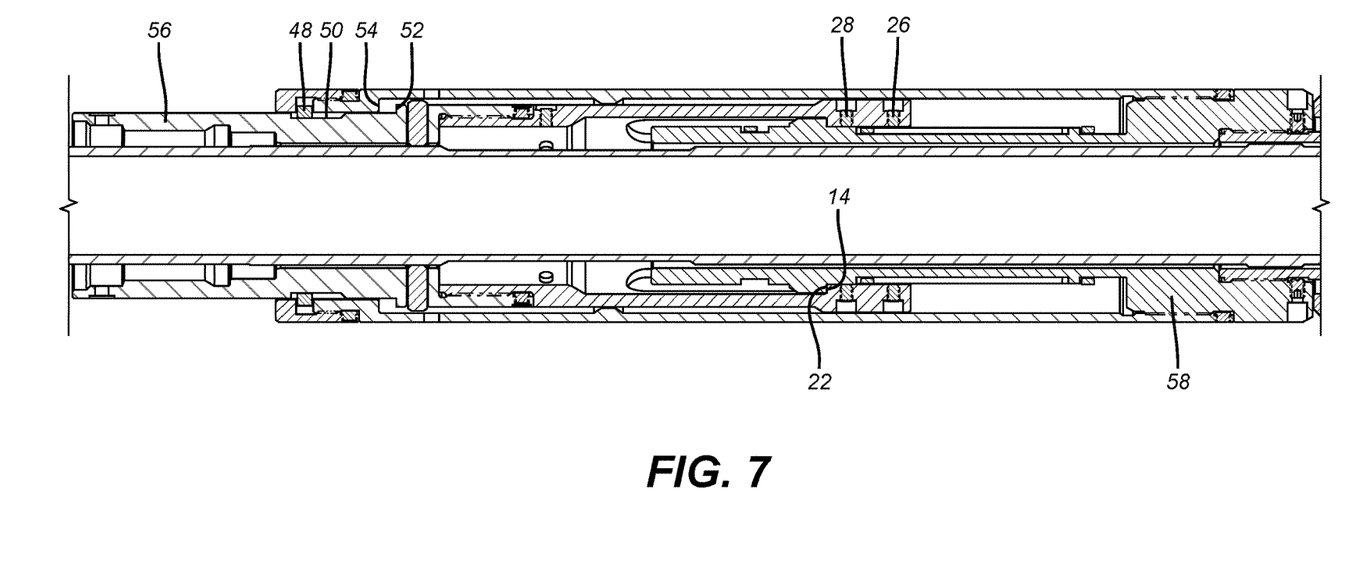
FIG. 7 is the view of FIG. 6 with the third shear screw sheared and the impact surface locked against the travel stop.

The sequence described above is illustrated in FIGS. 2-7 with FIG. 2 showing the run in position. In FIG. 3 sleeve 42 has moved to allow dogs 36 to move into recess 46 and initial relative movement has started but not enough to break pin. In FIG. 4 the relative movement has continued and the pin 26 is at the end of slot 32 and is on the verge of being sheared. In FIG. 5 pin 28 has started its movement along long slot 34 which keeps impact surfaces 14 aligned with travel stops 22 until shortly before impact, which is illustrated in FIG. 6. Between FIGS. 6 and 7, the pin 28 has sheared and the snap ring 48 has landed in groove 50, which locks impact surfaces 14 to travel stops 22. It should be noted that shoulder 52 can engage shoulder 54 as a backup to removal of the assembly from the hole with top sub 56 in the event that the travel stops 22 fail to retain lower assembly 58 for any reason.

Those skilled in the art will appreciate that the number of stages of pins to be sheared during the range of relative movement before surfaces impact can be varied. While three stages are illustrated there can be greater or fewer stages used. Each stage can have one or more pins or other devices that break or effectively retard acceleration of the moving component. The pins in one stage can be set to the same or different levels of force required to shear them. Apart from acceleration retarding devices that take effect as relative axial movement takes place before impact there can also be impact absorption coincident with the time of impact. The collet fingers 18 that support the segmented stop surfaces 22 themselves have the ability to flex radially in opposed direction creating a moving wave pattern in each finger as the collet fingers get put into tension on impact of 14 with 22. The two relatively moving parts 10 and 12 are preferably coaxial to guide the moving component 10 to reduce or eliminate the incidence of off-center impacts that could ruin components or at least make redressing the tool more difficult. While the preferred embodiment combines retarding acceleration before component impact with minimizing impact stress using flexible members that dissipate energy, either of these techniques can be used in isolation. It is often the case in downhole tools that space is very much at a premium. This requires attention to component design to be able to fit as many acceleration retarding components with an impact reducing feature such as flexible fingers 18. The use of the flexible fingers that are spaced apart allows the use of segmented surfaces 14 and 22 and the ability to position them for impact using a bayonet style mounting of axially advancing projections 16 in slots between fingers 18 and then relatively rotating the components to align surfaces 14 and 22 and keep them in alignment with pin 28 to virtually the point of impact.

The above description is illustrative of the preferred embodiment and many modifications may be made by those skilled in the art without departing from the invention whose scope is to be determined from the literal and equivalent scope of the claims below:

We claim:

1. An impact absorbing assembly for a subterranean tool, comprising:
   a supported component comprising at least one travel stop;
   a relatively moving component having at least one impact surface that selectively directly engages said at least one travel stop;
   a plurality of retainers disabled by shearing at different times during movement of said relatively moving component before said at least one impact surface lands in direct contact on said at least one travel stop.

2. The assembly of claim 1, wherein:
   at least one of said retainers rotationally locks said components until said at least one retainer is defeated.

3. The assembly of claim 1, wherein:
   a first of said plurality of retainers is defeated on initial relative movement of said components.

4. The assembly of claim 3, wherein:
   delay in defeat of a second of said plurality of retainers is accomplished with a first axial slot on said relatively moving component having an end engaging said second of said plurality of said retainers to provide lost motion delay for defeat of said second retainer after defeat of a first of said plurality of said retainers on initial relative movement of said components.

5. The assembly of claim 4, wherein:
   delay in defeat of a third of said plurality of retainers is accomplished with a second axial slot on said relatively moving component having an end engaging said third of said plurality of retainers, said second axial slot end located adjacent said impact surface.

6. The assembly of claim 5, wherein:
   said second radial groove is spaced from a first radial groove whose end engages said second of said plurality of retainers.

7. The assembly of claim 5, wherein:
   said second axial slot is spaced from said first axial slot whose end engages said second of said plurality of retainers.

8. The assembly of claim 4, wherein:
   delay in defeat of a third of said plurality of retainers is accomplished with a second radial groove on said relatively moving component having an end engaging said third of said plurality of retainers, said radial groove end located adjacent said impact surface.

9. The assembly of claim 3, wherein:
   delay in defeat of a second of said plurality of retainers is accomplished with a radial groove on said relatively moving component having an end engaging said second of said plurality of said retainers to provide lost motion delay for defeat of said second of said plurality of said retainers after defeat of a first retainer on initial relative movement of said components.

10. The assembly of claim 1, wherein:
    said retainers comprise shear pins that have the same or different shear ratings for failure.

11. The assembly of claim 1, wherein:
    said relatively movable component is centralized within said supported component.

12. The assembly of claim 1, further comprising:
    a locking retainer engaging said components against reversal of said relative movement upon or after engagement of said impact surface on said travel stop.

13. The assembly of claim 1, further comprising:
    an outer sleeve on said supported component having a backup support shoulder to engage said relatively movable component for retrieval thereof should said travel stop fail to support said relatively movable component by said impact surface.

14. The assembly of claim 1, wherein:
    said travel stop comprises spaced apart segments on axially extending elongated flexible fingers.

15. The assembly of claim 14, wherein:
    at least some of said plurality of retainers are supported in said fingers.

16. An impact absorbing assembly for a subterranean tool, comprising:
    a supported component comprising at least one travel stop;
    a relatively moving component having at least one impact surface that selectively engages said at least one travel stop;
    a plurality of retainers disabled at different times during movement of said relatively moving component before said at least one impact surface lands on said at least one travel stop;
    said travel stop comprises spaced apart segments on elongated flexible fingers;
    said flexible fingers are circumferentially spaced to define axial gaps;
    said at least one impact surface comprises a plurality of impact surfaces;
    said impact surfaces are insertable into said axial gaps and relatively rotatable into alignment with said travel stops, whereupon insertion of said plurality of retainers retains said components to each other, said components selectively locked to a housing until a mandrel is axially moved in said housing releasing said selective locking.

17. An impact absorbing assembly for a subterranean tool, comprising:
    a supported component comprising at least one travel stop;
    a relatively moving component having at least one impact surface that selectively engages said at least one travel stop;
    a plurality of retainers disabled at different times during movement of said relatively moving component before said at least one impact surface lands on said at least one travel stop;
    said travel stop comprises spaced apart segments on elongated flexible fingers;
    said fingers are placed in tension when said impact surface engages said travel stop causing said fingers to flex radially in opposed radial directions to reduce impact of said impact surface on said travel stop.

18. The assembly of claim 17, wherein:
    said impact surface comprises circumferentially spaced segments.

19. An impact absorbing assembly for a subterranean tool, comprising:
    a supported component comprising a travel stop;
    a relatively moving component having an impact surface that selectively engages said travel stop;

said travel stop comprises spaced apart segments on axially oriented elongated flexible fingers defining axial gaps therebetween.

20. The assembly of claim 19, wherein:

said flexible fingers support a plurality of retainers.

21. The assembly of claim 19, wherein:

said impact surfaces are insertable into said axial gaps and relatively rotatable into alignment with said travel stops, whereupon insertion of a plurality of retainers retains said components to each other, said components selectively locked to a housing until a mandrel is axially moved in said housing releasing said selective locking.

22. An impact absorbing assembly for a subterranean tool, comprising:

a supported component comprising a travel stop;

a relatively moving component having an impact surface that selectively engages said travel stop;

said travel stop comprises spaced apart segments on elongated flexible fingers;

said fingers are placed in tension when said impact surface engages said travel stop causing said fingers to flex radially in opposed radial directions to reduce impact of said impact surface on said travel stop.

23. The assembly of claim 22, wherein:

said impact surface comprises circumferentially spaced segments.

* * * * *